(12) United States Patent
Hulteberg et al.

(10) Patent No.: US 9,249,368 B2
(45) Date of Patent: Feb. 2, 2016

(54) SYSTEM AND PROCESS FOR GASIFYING BIOMASS

(75) Inventors: Christian Hulteberg, Malmö (SE); Håkan Holmberg, Skellefteå (SE); Torbjörn Wahlberg, Skellefteåhamn (SE); Harry Johansson, Skellefteå (SE)

(73) Assignee: Meva Innovation AB, Skelleftea (SE)

( * ) Notice: Subject to any disclaimer, the term of this patent is extended or adjusted under 35 U.S.C. 154(b) by 941 days.

(21) Appl. No.: 13/508,078

(22) PCT Filed: Nov. 8, 2010

(86) PCT No.: PCT/SE2010/051217
§ 371 (c)(1), (2), (4) Date: Aug. 13, 2012

(87) PCT Pub. No.: WO2011/056142
PCT Pub. Date: May 12, 2011

(65) Prior Publication Data
US 2012/0304540 A1 Dec. 6, 2012

Related U.S. Application Data

(60) Provisional application No. 61/272,818, filed on Nov. 6, 2009.

(51) Int. Cl.
| | |
|---|---|
| *C10J 3/84* | (2006.01) |
| *C10L 3/00* | (2006.01) |
| *B01J 7/00* | (2006.01) |
(Continued)

(52) U.S. Cl.
CPC . *C10K 1/14* (2013.01); *B03C 3/017* (2013.01); *B03C 3/16* (2013.01); *C10J 3/487* (2013.01); *C10J 3/721* (2013.01); *C10K 1/028* (2013.01); *C10K 1/046* (2013.01); *C10K 1/16* (2013.01); *C10G 2300/1011* (2013.01); *C10G 2300/1014* (2013.01); *C10G 2300/301* (2013.01); *C10J 2300/0916* (2013.01); *C10J 2300/0956* (2013.01); *C10J 2300/165* (2013.01); *C10J 2300/1807* (2013.01)

(58) Field of Classification Search
CPC combination set(s) only.
See application file for complete search history.

(56) References Cited

U.S. PATENT DOCUMENTS

| 4,305,909 A | 12/1981 | Willett et al. |
| 5,980,858 A | 11/1999 | Fujimura et al. |
(Continued)

FOREIGN PATENT DOCUMENTS

| EP | 2 077 311 A1 | 7/2009 |
| FR | 2 566 793 A1 | 1/1986 |
(Continued)

OTHER PUBLICATIONS

International Search Report for corresponding International Application No. PCT/SE2010/051217 mailed Jan. 28, 2011.
(Continued)

*Primary Examiner* — Kaity Handal
(74) *Attorney, Agent, or Firm* — Renner, Otto, Boisselle & Sklar, LLP (57) ABSTRACT

Disclosed area process and a system for gasifying biomass to obtain a combustible gas for combustion in an engine. Further, a method and a purification system for removing tar components from a combustible gas having a temperature above its dew-point are disclosed.

8 Claims, 1 Drawing Sheet

(51) Int. Cl.
  *C10K 1/14* (2006.01)
  *C10K 1/04* (2006.01)
  *B03C 3/017* (2006.01)
  *B03C 3/16* (2006.01)
  *C10J 3/48* (2006.01)
  *C10J 3/72* (2006.01)
  *C10K 1/02* (2006.01)
  *C10K 1/16* (2006.01)

(56) References Cited

U.S. PATENT DOCUMENTS

| | | | |
|---|---|---|---|
| 7,202,389 | B1 | 4/2007 | Brem |
| 2008/0016769 | A1 | 1/2008 | Pearson |
| 2008/0244976 | A1* | 10/2008 | Paisley .................. 48/62 R |
| 2009/0119990 | A1* | 5/2009 | Johnson et al. .............. 48/61 |
| 2009/0173226 | A1 | 7/2009 | Lomax, Jr. et al. |

FOREIGN PATENT DOCUMENTS

| | | |
|---|---|---|
| JP | 2007-45857 A | 2/2007 |
| WO | 03/057371 | 7/2003 |
| WO | 2008/010717 A2 | 1/2008 |
| WO | 2008/096379 A1 | 8/2008 |
| WO | 2009/020442 | 2/2009 |

OTHER PUBLICATIONS

Written Opinion of the International Search Authority for corresponding International Application No. PCT/SE2010/051217 mailed Jan. 28, 2011.

International Preliminary Report on Patentability corresponding International Application No. PCT/SE2010/051217 mailed Dec. 20, 2011.

DTI, "Development of a 250 kWE Downdraft Gasifier for CHP", 2006, Biomass Engineering Ltd., 60 pages.

Wang et al., "Performance optimization of two-staged gasification system for woody biomass", Fuel Processing Technology 88, 2007, pp. 243-250.

Henriksen et al., "The design, construction and operation of a 75 kW two-stage gasifier", Energy 31, 2006, pp. 1542-1553.

Ahrenfeldt et al., "Validation of a Continuous Combined Heat and Power (CHP) Operation of a Two-Stage Biomass Gasifier", Energy & Fuels 20, 2006, pp. 2672-2680.

Extended European Search Report for corresponding Application No. EP 10828629.5 dated Apr. 15, 2013.

Syred et al., "Cyclone gasifier and cyclone combustor for the use of biomass derived gas in the operation of a small gas turbine in cogenerati8on plants", Fuel 83, 2004, pp. 2381-2392.

* cited by examiner

SYSTEM AND PROCESS FOR GASIFYING BIOMASS

This application is a national phase of International Application No. PCT/SE2010/051217 filed Nov. 8, 2010 and published in the English language, which claims priority to Application No. U.S. 61/272,818 filed Nov. 6, 2009.

FIELD OF THE INVENTION

The present invention relates to a process and a system for gasifying biomass to obtain a combustible synthesis gas. More specifically the invention relates to a process and a system, wherein biomass is combusted with sub-stoichiometric quantities of oxygen to generate a combustible gas, from which tar components are removed. Further, the present invention relates to a method and a purification system for removing tar components from a combustible gas having a temperature above its dew-point.

BACKGROUND

Gasification of biomass and subsequent combustion to generate power is an interesting small scale system for combined heat and power supply.

Combustion of biomass to produce steam for use in a steam turbine is only effective in large scale systems having an effect for more than 50 MW. System having an effect less than about 10 MW, such as small scale system for combined heat and power supply, are an interesting alternative for industries having need of heat and power and further having an energy rich biomass waste, such as the paper pulp industry. Further, such small scale system for combined heat and power supply are of interest for urban districts having a net for district heating.

There are a lot of different proposals on how gasifier-engine systems may be designed. One of the simplest ways to construct such a system is to use a common fixed-bed gasifier and a standard Otto engine. This solution has for example been used by the American company Community Power Corporation which is producing small scale combined heat and power systems. The British company Biomass Engineering Ltd uses more or less the same technique and has an electric efficiency of about 25% in their 250 kWe pilot plant, where the gasifier had an efficiency of 80% (DTI, Development of a 250 kWe Downdraft Gasifier for CHP. 2006, Biomass Enginering Ltd.).

The BTG Biomass Technology Group in the Netherlands used a downdraft gasifier and had a relatively high engine efficiency of 37% (gas to electricity) at their tests of a 215 kWe plant. At the same time the gasifier efficiency was only 71%, which gave an overall electric efficiency of 27% gross. In this study the temperature of the producer gas was kept over the dew point to avoid production of condensate.

Downdraft gasifiers provide a gas suitable for subsequent combustion. However, a significant part of the carbon initially present in the biomass, typically 4 to 7%, will end up in the residual ash, thus lowering the overall efficiency of the systems comprising a downdraft gasifier. In addition, downdraft gasifiers operate with a rather high oxygen:biomass ratio. Thus, a fairly high degree of the biomass is oxidized already at the gasification stage, lowering the heat value of the generated gas to be combusted subsequently.

A way to get more control over the gasification is to split the process into two stages. Wang et al. used an updraft gasifier combined with a subsequent reformer to crack tars using partial oxidation (Wang, Y., et al., Performance optimization of two-staged gasification system for woody biomass. Fuel Processing Technology, 2007. 88: p. 243-250). The electric efficiency of this system was claimed to be 27% gross, were gross means excluding parasitic losses. The engine they were using was a diesel engine, and to ignite the mixture of air and producer gas diesel oil was used. This means that their system needs both wood chips and diesel oil to operate.

The Biomass Gasification Group in Denmark has designed a two-stage gasifier called Viking (Henriksena, U., et al., The design, construction and operation of a 75 kW two-stage gasifier. Energy, 2006. 31: p. 1542-1553). Here heat from the engine's exhaust gases were transferred to the incoming wood chips in a pyrolysis reactor, where the temperature reached about 600° C. The feed of pyrolysis products, that is gas, vaporized tars and charcoal, enters a downdraft gasifier, operating as a reformer. In the upper part of the gasifier, the tars were partially oxidized with air and reached a temperature of about 1200° C. In the lower part of the gasifier the charcoal was gasified. The fuel to gas efficiency of a 70 kWin pilot plant was 93.2%, the gas to electricity efficiency was 29.1% and the overall fuel to net electricity was 25.1% (Ahrenfeldt, J., et al., Validation of a Continues Combined Heat and Power (CHP) Operation of a Two-Stage Biomass Gasifier. Energy & Fuels, 2006. 20: p. 2672-2680). The efficiency of their engine was not as impressive as the gasifier and this was partly because no supercharging was used and that the engine only operated at part load.

Systems comprising a reformer suffer from the need for a rather high oxygen:biomass ratio in the gasification step(s). Thus, a fairly high degree of the biomass is oxidized already at the gasification stage, lowering the heat value of the generated gas to be combusted subsequently.

The residence time of biomass in systems of the art is fairly long. As a consequence, systems in the art all suffer from demanding long periods of time for start up and equilibration. From a safety perspective, i.e. to lower the risk of explosions and conflagration, a lower amount of biomass present in the system would also be desirable.

Further, systems in the art are adopted solely for solid biomass and are hence not suitable for gasification of alternative streams of carbonaceous liquid. In addition, systems in the art are not suitable for varying the fed of biomass over time. Furthermore, the above mentioned systems are all fairly complex and hence costly.

Thus, there is need within the art for an alternative process and a system for gasifying biomass to obtain synthesis gas mitigating, alleviating, eliminating, overcoming or circumventing the above mentioned problems.

SUMMARY

Consequently, the present invention seeks to mitigate, alleviate, eliminate, over-come or circumvent one or more of the above-identified deficiencies in the art and disadvantages singly or in any combination by providing a process for gasifying biomass to obtain combustible gas for combustion in an combustion engine, comprising the steps of:
  providing solid biomass, such as pellets substantially made from wood, having a particle size of less than 3 mm, such as less than 1 mm, and a moisture ratio of not more than 15 wt %, such as not more than 10 wt %;
  gasifying the biomass in a cyclone gasifier at 400° C. to 1300° C., such as at 700° C. and 900° C., in the presence of sub-stoichiometric quantities of oxygen, such as less then 50%, such as less than 40 or 30%, of the amount of oxygen needed for complete combustion;

separating particulate matter from the combustible gaseous stream obtained by gasifying the biomass;

adiabatically and convectively cooling the combustible gaseous stream, obtained by gasifying the biomass, by contacting it with an organic liquid, such as a methyl ester of a fatty acid or a mixture of methyl esters of fatty acids, preferably having boiling point or more than 100° C., such as more than 150° C. or more than 200° C., at atmospheric pressure, having a temperature below the dew-point of the combustible gaseous stream; whereby tar components present in the combustible gaseous stream are condensed;

electrostatically removing particles, comprising tar components, from the adiabatically and convectively cooled combustible gaseous stream; and optionally condensing evaporated organic liquid present in the adiabatically and convectively cooled combustible gaseous;

to obtain a combustible gas for combustion in a combustion engine. The amount of organic liquid brought in contact with the combustible gaseous stream, to adiabatically and convectively cool it, may be 4 to 10 times the amount of combustible gaseous stream on weight basis.

The process may further a step of separating the tar components, condensed by adiabatically and convectively cooling the combustible gaseous stream, and none-evaporated organic liquid from the adiabatically and convectively cooled combustible gaseous stream to obtain first stream of organic liquid comprising tar components. Similarly, the steps of electrostatically removing particles, comprising tar components, from the adiabatically and convectively cooled combustible gaseous stream, and condensing evaporated organic liquid present in the adiabatically and convectively cooled combustible gaseous, may be performed simultaneously in one step, to generate a second stream of organic liquid comprising tar components. The first stream of organic liquid comprising tar components and/or the second stream of organic liquid comprising tar components may be gravimetrical separated into a tar enriched bottom fraction and a tar depleted over flow. Further, the tar enriched bottom fraction may be gasified together with the biomass in the cyclone gasfier. In addition, the tar depleted over flow may be cooled to a temperature below the dew-point of the combustible gaseous stream and subsequently used to adiabatically and convectively cool the combustible gaseous stream.

Similarly, the present invention also seeks to mitigate, alleviate, eliminate, over-come or circumvent one or more of the above-identified deficiencies in the art and disadvantages singly or in any combination by providing a system for gasifying biomass to obtain a combustible gas for combustion in a combustion engine, comprising:

a cyclone gasifier, which may be lined with an isolating, refractory material, such as firebrick and/or refractory cement, for gasification of biomass in the presence of sub-stoichiometric quantities of oxygen to obtain a combustible gaseous stream;

a spray scrubber, having at least one spray nozzle for contacting the combustible gaseous stream with an organic liquid having a temperature below the dew-point of the combustible gaseous stream, and an outlet for collecting none-evaporated organic liquid, comprising condensed tar components; and a wet electrostatic precipitator for separating particles and condensing evaporated scrubber liquid from the combustible gaseous stream, wherein the wet electrostatic precipitator has at least one emitter electrode, at least one collector electrode having at least one deposition surface, preferably substantially vertically arranged, and an underlying hopper for collecting the condensed organic liquid, comprising tar components; the wet electrostatic precipitator further having cooling means for cooling the deposition surfaces.

Further, the system may comprise a first separator, being connected to the outlet, for collecting none-evaporated organic liquid, comprising condensed tar components, of the spray scrubber, for gravimetrically separating the none-evaporated organic liquid, comprising condensed tar components, into a first tar enriched bottom fraction and a first tar depleted over flow, the first separator having an outlet arranged in the vicinity of the bottom of the separator, for collecting the first tar enriched bottom fraction, and an over flow, for collecting the first tar depleted over flow. Similarly, the system may comprise a second separator, being connected to the hopper of the wet electrostatic precipitator, for gravimetrically separating condensed organic liquid, comprising tar components, into a second tar enriched bottom fraction and a second tar depleted over flow, the second separator having an outlet, arranged in the vicinity of the bottom of the separator, for collecting the first tar enriched bottom fraction, and an over flow, for collecting the first tar depleted over flow. The first and the second separator may be the very same separator.

In order to take advantage of the heat value of the tar enriched bottom fraction(s), the outlet of the first and/or second separator may connected to the cyclone gasifier, whereby the first and/or second tar enriched bottom fraction may be fed to the cyclone gasifier. Further, the over flow of the first and/or second separator may be connected to the at least one spray nozzle of the spray scrubber, whereby the first and/or second tar depleted over flow may be contacted with the combustible gaseous stream in the spray scrubber. The system may further comprise a cooling unit, such as a heat exchanger, for cooling the over flow of the first and/or second separator before being contacted with the combustible gaseous stream in the spray scrubber.

Another aspect of the invention, relates to a purification system, which may be part of a system for gasifying biomass to obtain a combustible gas for combustion in a combustion engine. Such a purification system may be used for removing tar components from a combustible gas having a temperature above its dew-point. Further it may comprise:

a spray scrubber having at least one spray nozzle for contacting the combustible gas with an organic liquid having a temperature below the dew-point of the combustible gas; further the spray scrubber has an outlet for collecting none-evaporated organic liquid, comprising condensed tar components; and a wet electrostatic precipitator for separating particles and evaporated scrubber liquid from the combustible gas, wherein the wet electrostatic precipitator has at least one emitter electrode, at least one collector electrode having at least one deposition surface, preferably substantially vertically arranged, and an underlying hopper for collecting the condensed organic liquid, comprising tar components; the wet electrostatic precipitator further having cooling means for cooling the deposition surfaces; wherein an outlet for the combustible gas of the spray scrubber is connected to an inlet for the combustible gas of the wet electrostatic precipitator.

Similarly, another aspect of the invention relates to a method for removing tar components from a combustible gas having a temperature above its dew-point, comprising the steps of:

adiabatically and convectively cooling the combustible gas by contacting it with an organic liquid having a temperature below the dew-point of the combustible gaseous stream; whereby tar components present in the combustible gas are condensed;

electrostatically removing particles, comprising tar components, from the adiabatically and convectively cooled combustible gas; and optionally condensing evaporated organic liquid present in the adiabatically and convectively cooled gas;

to obtain a combustible gas with lower amount of tar components.

Further advantageous features are defined in the dependent claims. In addition, advantageous features of the invention are elaborated in embodiments disclosed herein.

DESCRIPTION

EMBODIMENTS

The present inventors has envisaged that gasification of biomass in a cyclone gasifer, purification of the obtained combustible gas from tar by use of a spray scrubber and a wet electrostatic precipitator, and subsequent combustion of the gas in an combustion engine represents an interesting small scale system for combined heat and power supply overcoming several drawback of systems within the art.

Thus, an embodiment relates to a process for gasifying biomass to obtain combustible gas for combustion in an engine may comprise the steps of:

providing solid biomass having a particle size of less than 3 mm, preferably less than 1 mm, and a moisture ratio of not more than 15 wt %, such as not more than 10 or 8 wt %;

gasifying the biomass in a cyclone gasifier at 400° C. to 1300° C., such as 700° C. to 900° C., in the presence of sub-stoichiometric quantities of oxygen, such as less than 50, 40, or 30% of the amount of oxygen needed for complete combustion;

optionally lowering the temperature of the combustible gaseous stream obtained;

separating particulate matter, e.g. ash, from the combustible gaseous stream obtained by gasifying the biomass in the cyclone gasifier and optionally also in at least one further cyclone down-stream of the cyclone gasifier;

adiabatically and convectively cooling the combustible gaseous stream, obtained by gasifying the biomass, by contacting it with an organic liquid having a temperature below the dew-point of the combustible gaseous stream; whereby tar components present in the combustible gaseous stream are condensed;

electrostatically removing particles, comprising tar components, from the adiabatically and convectively cooled combustible gaseous stream; and optionally condensing evaporated organic liquid present in the adiabatically and convectively cooled combustible gaseous;

to obtain a combustible gas for combustion in an engine.

The steps of electrostatically removing particles, comprising tar components, from the adiabatically and convectively cooled combustible gaseous stream, and condensing evaporated organic liquid present in the adiabatically and convectively cooled combustible gaseous, may be performed in a single step.

According to an embodiment, a system for gasifying biomass to obtain a combustible gas for combustion in an engine may comprise:

a cyclone gasifier, having an upper cylindrical part with at least one inlet for feeding air and biomass fed tangential, a lower conical part, and vortex finder as an outlet for the generated combustible gaseous stream, for gasification of biomass in the presence of sub-stoichiometric quantities of oxygen to obtain a combustible gaseous stream; the vortex finder may be arranged at the upper end of the cyclone at or near the center of the axis of the cyclone; further the cyclone may be lined with isolating, refractory material;

optionally at least on further cyclone connected downstream of the cyclone gasifier for separating ash particles present in the combustible gaseous stream;

a spray scrubber having at least one spray nozzle for contacting the combustible gaseous stream with an organic liquid having a temperature below the dew-point of the combustible gaseous stream; further the spray scrubber has an outlet for collecting none-evaporated organic liquid, comprising condensed tar components; the outlet may be arranged at the vicinity of the bottom of the wet scrubber; evidently the spray scrubber has an inlet and an outlet for the combustible gaseous stream; and a wet electrostatic precipitator for separating particles and condensing evaporated scrubber liquid from the combustible gaseous stream, wherein the wet electrostatic precipitator has at least one emitter electrode, at least one collector electrode having at least one deposition surface, and an underlying hopper for collecting the condensed organic liquid, comprising tar components; the wet electrostatic precipitator further having cooling means for cooling the deposition surface.

According to an embodiment, biomass is intended to mean a material obtained from organisms or plants. Typically biomass predominantly comprises carbon, hydrogen, and oxygen. It may further comprise nitrogen and small quantities of other atoms, including alkali and alkaline earth metals.

Examples of biomass includes cultivated plants, rice polish, peat, biomass residue streams, such as prunings, trimmings and waste from parks and public gardens, and waste such as wood from demolition work and the un-separated biodegradable fraction of domestic refuse and industrial waste.

In order for the gasification to be efficient, the biomass is typically finely divided before being gasified. Thus, the particle size, such as the Ferrets diameter, may be not more than 3 mm, such as not more 1 mm. In order to reduce the particle size, the biomass may be cut, crushed, chopped, and/or ground. Further, it is preferred if the biomass to be gasified has a moisture ratio of not more than 15 wt %, such as not more than 10 or 8 wt %. In order to affect the moisture ratio, the biomass may be dried before being gasified. Typically, the biomass is dried prior to being finely divided. Any conventional technique, such as a fluidized bed dryer, may be used to dry the biomass, One preferred form of biomass is a pellet. One preferred type of pellet is a pellet substantially made from wood.

The biomass to be gasified and oxygen, typically in the form of air, is introduced into a cyclone gasifier in sub-stoichiometric quantities. By thermal conversion at a temperature of 400° C. to 1300° C., such as 700° C. to 900° C., in the presence of sub-stoichiometric quantities of oxygen, the solid biomass may be thermally degraded to a combustible gaseous stream comprising mainly CO, $CO_2$, $H_2$, $CH_4$ and $N_2$.

According to an embodiment, sub-stoichiometric quantities of oxygen is intended to mean less then 50% of the amount of oxygen needed for complete combustion, corresponding to a lambda value of 0.5 or less. Further, the amount of oxygen fed may even correspond to a lambda value of 0.4 or less, such as 0.3 or less, i.e. less then 40% and 30% of the amount of oxygen needed for complete combustion, respectively. As an example, if the hourly feeding of biomass is 100 kg, then the hourly feeding of air may be 180 kg. Thus, the weight ratio between biomass and air fed into the gasifier, may be between 1:1.5 and 1:2.

In order to compensate for the low residence time for particles in typical gasifiers within the art, such gasifiers are normally operated at significant overpressure, i.e. more than 1 bar above atmospheric pressure. However, feeding biomass to a gasifier operating at such an over pressure may be difficult.

In a cyclone gasifier, the residence time for particles is sufficient to allow efficient gasification even if the cyclone gasifier is operated at about atmospheric pressure. According to an embodiment, the pressure within the gasifier may thus be at about atmospheric pressure, such as from 0.5 to 1.5 Bar (50 to 150 Pa), such as from 0.8 to 1.2 Bar (80 to 120 Pa)

The combustible gaseous stream comprising CO, $CO_2$, $H_2$, $CH_4$ and $N_2$ may, in addition to steam, typically also comprise other components, which are substantially liquid at room temperature, known as tars. While methane, i.e. $CH_4$, typically is the predominating lower hydrocarbon, other lower hydrocarbons, such as ethane and propane, may also be present in the combustible gaseous stream.

In order to avoid complete combustion of the biomass, the amount of oxygen provided has to be sub-stoichiometric. As the biomass is not completely combusted, species such as CO, $H_2$, and $CH_4$, may be combusted downstream of the gasification to generate power.

As already disclosed, the obtained combustible gaseous stream may, in addition to the gases CO, $CO_2$, $H_2$, $CH_4$ and $N_2$, contain various other higher hydrocarbons, including components classified as tar components. Tar is a group of compounds comprising higher hydrocarbons, usually with one or more condensed aromatic groups such as e.g. naphthalene.

Further, the combustible gaseous stream may contain solid ash particles, typically comprising oxides and salts of alkali and alkaline earth metals, e.g. calcium carbonate, calcium oxide and potash. As the gasifier employed is a cyclone, ash particles may accumulate at the bottom of the gasifier as residual ash. Thus, the need for subsequent separation of ash particles from the combustible gaseous stream may be reduced or even eliminated.

However, ash particles may be present also in the combustible gaseous stream as fly ash. As further elaborated below, the system may include at least one further cyclone to remove fly ash from the combustible gaseous stream.

Gasification of the biomass may take place in a gasifier. The gasifier may preferably constructed as a cyclone, having an upper cylindrical part and a lower conical part, where the biomass particles to be gasified are introduced with air in the upper part of the cyclone. The feeding of the biomass and air to the cyclone may be adjusted to yield a high enough residence time for the carbon containing particles to be thermally degraded. As indicated above, the use of a cyclone gasfier may eliminate the need to operate the gasifier at elevated high pressure to attain sufficient residence time.

Air and biomass may be fed tangential to the upper cylindrical part of the vertical arranged cyclone by at least one injector to generate a swirl flow within the cyclone. Additional oxygen may be fed at other locations, such as the bottom, of the cyclone as well, as long as the total amount of oxygen provided is sub-stoichiometrical with respect to the provided biomass. Such addition may give rise to a more even temperature profile within the gasifier.

The outlet, sometimes denoted vortex finder, for the generated combustible gaseous stream may be arranged at the upper end of the cyclone at or near the center of the axis of the cyclone. In order for the biomass to have a sufficient residence time and thereby an efficient gasification, the part of the vortex finder may be a pipe extending within the cyclone below the plane wherein the biomass and air is tangentially injected.

According to an embodiment, the cyclone gasifier may be constructed to have a Swirl number ($S_{gT}$) of 8 to 20, wherein the Swirl number may be determined form the following formula:

$$S_{gT} = \frac{De \times D}{n \times D_i^2} \times \frac{T_{in}}{T_{out}}$$

wherein De is the diameter of the vortex finder, D is the diameter of the upper cylindrical part, Di is the diameter of feeding pipe(s) for the biomass, "n" is an integer representing the number of pipe(s) feeding for the biomass, $T_{in}$ is the temperature of the air and biomass fed and $T_{out}$ is the temperature of generated combustible gaseous stream upon leaving the cyclone gasifer.

Further, the diameter of the vortex finder (De) may be chosen as half of the diameter of the upper cylindrical part (D). The height of the upper cylindrical part and the lower conical part may both be twice the diameter of the upper cylindrical part.

In a cyclone gasifier dimensioned for a fuel effect of 3 MW, the diameter of the upper cylindrical part may be 0.6 to 0.7 meter. Similarly, the diameter of the upper cylindrical part of cyclone gasifier dimensioned for a fuel effect of 10 MW may be 0.9 to 1.1 meter.

Further, the cyclone may have an ash collector at the bottom, allowing for removal of residual ash.

Due to the high temperature within the gasifier, the gasifier, which may be made of steel, is typically lined with an isolating, refractory material, such as firebrick and/or refractory cement.

As will be apparent below, the obtained combustible gaseous stream may be feed into a spray scrubber. Optionally, the temperature of the combustible gaseous stream may be lowered before being fed to the spray scrubber. Further, particles present in the combustible gaseous stream may be removed with a cyclone before the combustible gaseous stream is fed to the spray scrubber.

Any fly ash present in the combustible gaseous stream leaving the gasifier may typically be separated from the combustible gaseous stream as it may affect down stream purification of the gaseous stream. Thus, one or more cyclones may be used to remove fly ash from the gaseous stream. If more than one cyclone is used the cyclones may be arranged serial as well as parallel. However, as ash is separated in the cyclone gasifier as well, the need for subsequent separation of residual fly ash may be dispensed with.

As the temperature of the combustible gaseous stream leaving the cyclone is typically over 600° C., such as about 850° C., the stream may be cooled prior and/or subsequent to removing fly ash. Heat exchangers may be used to cool the stream. The temperature of the combustible gaseous stream prior to wet scrubbing may be between 450 and 600° C.

Eventually the combustible gaseous stream will be combusted in a combustion engine to generate power. However, the preferred temperature of the gas for combustion is below 60° C., such as between 50 and 60° C., i.e. well below the dew-point of the gas. However, condensation of tar components may result in problems due to fouling and should thus preferably be avoided. It is thus desirable to remove the tar before or upon lowering the temperature of the combustible gaseous stream to its dew-point.

According to an embodiment, dew-point, as used herein, is intended to mean the temperature at which a given parcel of gas must be cooled, at constant pressure, for components, such as tar components, dissolved in the gas to start to condense. The dew point thus may be seen as a saturation temperature. Hence, the dew-point, according an embodiment, is intended to mean the saturation temperature of the gas. The saturation temperature may relate to tar components dissolved in the combustible gaseous stream. Upon lowering the temperature of the combustible gaseous stream to the saturation temperature, tar components may thus start to condense.

The process may therefore comprise a purification system, wherein the tar components may be removed and the temperature of the combustible gaseous stream lowered.

In order to achieve this, the purification system may, according to an embodiment, comprise a wet scrubber and a down stream connected wet electrostatic precipitator (WESP).

The combustible gaseous stream, typically having a temperature of above 450° C., is introduced into a wet scrubber operating with an organic liquid having a temperature below the dew-point of the combustible gaseous stream. As the scrubber operates adiabatically, the temperature of the combustible gaseous stream will be lowered upon being fed to the scrubber and getting in contact with the organic liquid. Further, the tar components will start to condensate once the temperature is lowered and they will eventually be dissolved and/or dispersed in the organic liquid. In addition to be adibatically cooled, the combustible gaseous stream will also be convectively cooled, once the temperature of the adibatically cooled combustible gaseous stream is below the boiling point of the organic liquid.

Typically, the organic liquid may have a boiling point above 100° C., such as above 150° C., or even above 200° C.

The organic liquid may be selected from of a multitude of mineral and renewable oils. Preferred examples of renewable oils are tall oil, tall oil middle distillate, tall oil middle distillate methyl esters, methyl esters of fatty acids, corn oil, rape seed oil, palm oil, soy oil, cotton seed oil. Further, renewable oils are preferred over mineral oils.

According to an embodiment, the organic liquid may be a methyl ester of fatty acid or a mixture of methyl esters of fatty acids. Examples of such as methyl esters of fatty acids include methyl esters of rape seed oil and palm oil. According to an embodiment, fatty acids are linear or methyl substituted, saturated, mono- or polyunsaturated carboxylic acids comprising more than 10, such as more than 12, carbon atoms.

The wet scrubber may be a spray scrubber with at least one, but preferably more than 1, such as 3 or more, nozzle(s) for spraying the organic liquid. Thereby the combustible gaseous stream is cooled down adiabatically and convectively, while the organic liquid is heated and to some extent evaporated. As the temperature of the combustible gaseous stream is lowered, tar will start to condensate and the condensing tar components may be dissolved and/or dispersed in the organic liquid and hence separated from the combustible gaseous stream.

Excess of organic liquid may typically be used. Thus, the amount of organic liquid brought in contact with the combustible gaseous stream, to adiabatically and convectively cool it, may be 2 to 15 times, such 4 to 10 times, or 3 to 6 times, the amount of the combustible gaseous stream on weight basis.

None-evaporated organic liquid may be collected at the vicinity of the bottom of the wet scrubber having an outlet for the organic liquid. Before being re-injected to the scrubber, tar components dissolved and/or suspended in the liquid may be gravimetrical separated in a separator. The bottom fraction, being tar enriched, may be re-injected to the cyclone gasifier, rather than being disposed. Further, the over flow, being tar depleted, may be re-injected to the scrubber.

Further, the tar depleted organic liquid may be cooled in a cooling unit, typically a heat exchanger, before being re-injected to the wet scrubber. In order to be effective in cooling the combustible gaseous stream below its initial dew-point, and thus causing condensation of the tar components, the organic liquid may be cooled to a temperature well below the dew point of the combustible gaseous stream entering the wet scrubber. The temperature of the organic liquid being sprayed in the scrubber may be below 100° C., such as below 75° C.

Further, if excess of organic liquid on a weight basis is used, the temperature of the adiabatically and convectively cooled combustible gaseous stream leaving the scrubber will be equal or close to the temperature organic liquid being sprayed in the scrubber. The temperature of the adiabatically and convectively cooled combustible gaseous stream leaving the scrubber may hence be controlled by controlling the temperature organic liquid being sprayed in the scrubber. As a gas temperature of 50 to 60° C. may be suitable for a gas to be combusted in a combustion engine, the temperature of the organic liquid being sprayed in the scrubber may be 50 to 60° C.

Part of the organic liquid may be evaporated in the wet scrubber and thus being part of the combustible gaseous stream leaving the wet scrubber. As the combustible gaseous stream leaving the wet scrubber may be over-saturated with organic liquids, part of the evaporated organic liquid may eventually form an aerosol and may thus be separated in the down stream wet electrostatic precipitator. Further, some of the evaporated organic liquid will remain in gaseous state. Such gaseous organic liquid may be combusted with other combustible constituents of the combustible gaseous stream.

However, as the deposit surfaces of the collector electrodes in the wet electrostatic precipitator may be provided with cooling means, some gaseous organic liquid may be condensed in the wet electrostatic precipitator.

Typically, scrubbers used for removing impurities from gaseous streams are operated with water. However, use of a scrubber operated with water to separate tar components from the combustible gaseous stream is disadvantageous for several reasons. Hydrophilic tar components will dissolve in the water and subsequently be hard to separate from the water. Further, hydrophobic tar components will stick to various surfaces within the scrubber and its outlet for the scrubber liquid.

Using an organic liquid of the type disclosed herein may solve or at least alleviate the aforementioned problems.

Further, spray scrubbers are a preferred type of scrubber compared to other types of scrubbers, such as packed bed type scrubbers, which often are employed due to the large surface present for absorption of impurities present in contaminated gases. However, in spray scrubbers the surface for absorption is the surfaces of the liquid drops formed by the spray nozzles. Thus, spray scrubbers have a very limited solid surface area to which tar components may stick.

Use of an organic liquid having a boiling point of more than 100° C., rather than water, may further imply that none-evaporated organic liquid leaving the scrubber may have temperature above 100° C., and hence being well suited for heating a district heating system.

After passing the wet scrubber, the combustible gaseous stream is passed through a wet electrostatic precipitator (WESP), sometimes denoted wet electrostatic filter. In the WESP, particles, such as aerosol particles, comprising ash, organic liquid and/or tar, may be collected and thus separated from the combustible gaseous stream.

In the wet electrostatic precipitator, the combustible gas comprising evaporated organic liquid, aerosol of the organic liquid, and still some tar components, is passed between emitter and collector electrodes, over which voltage is applied, thereby particles present are charged any thus attracted to the collector electrodes. As the combustible gas comprises aerosol particles of the organic liquid used in the scrubber, a liquid film will form at the collector electrode having deposition surfaces typically being essentially vertical arranged.

In the film, any other particles present in the combustible gaseous stream may be dissolved or at least suspended. Further, the film may also dissolve gaseous organic liquid present in the combustible gaseous stream. As the deposition surfaces may be vertical arranged with the WESP, the liquid film with impurities may be gravimetrically transported down along the deposition surfaces to an underlying hopper, which also may be denoted collection pocket.

If the electrostatic precipitator were operated dry, the tar content would solidify upon the deposition surfaces. Thereby the deposits would gradually eliminate the grade of separation of the electric precipitator. Further, there would be need for removing the tar deposits repeatedly, which would complicate continuously operation of the system. By operating the electrostatic precipitator wet, the problems of increasing solid tar deposits are avoided. As the wet electrostatic precipitator has an underlying hopper for collecting the organic liquid, it may further be provided with overlying spray nozzles for flushing the electrodes, if needed.

Further, the deposition surfaces may be equipped with cooling means, whereby they may be cooled. By continuously cooling the deposition surfaces evaporated organic liquid continues to condensate upon the deposition surfaces even though aerosol particles of organic liquid are removed. Thus, a reinforced liquid film is formed at the deposition surfaces and the transportation of impurities down to the underlying hopper is facilitated. Cooling of the deposition surfaces may be effected by passing a fluid, such as air or water, over a side of the deposit surface distinct from a side wherein organic liquid condenses.

According to an embodiment, the WESP may have a down flow tubular design, i.e. the collector electrodes may be essentially vertical arranged tubes with the emitter electrodes arranged along the axis of the collector electrodes. As already elaborated such a design allows the collected moisture and particulate to form a slurry that may be gravimetrically removed and thus keeps the deposition surfaces clean.

The electrodes used in the WESP may be of various designs. According to an embodiment, the emitter electrode(s) may be a tube having electrode elements that consist of a tab or a tongue bent outwardly from the wall of the tube. Further, the tab or tongue may also be bent upwards. In addition, the discharge electrode may have a tab or a tongue that is bent inwardly from the tube wall positioned generally diametrical to a corresponding outwardly bent tab or tongue. The discharge electrode may have opening(s) in the wall of the electrode in connection with each outwardly bent tab or tongue. Such an electrode is disclosed in WO 03/057371.

According to an embodiment, the emitter electrode(s) may be pipe, such as essentially cylindrical tubes.

As part of the organic liquid used in the wet scrubber is evaporated and subsequently collected in the wet electrostatic precipitator with tar components, a single separator may be used to separate tar components from the organic liquid collected in the scrubber as well as in the one collected in the wet electrostatic precipitator. As the organic liquids will be over-saturated with tar components and as at least part of the components typically has higher density or are solids suspended in the organic liquid, the separator may operate gravimetrically. Thus, a tar enriched bottom fraction may be collected at the bottom of the separator, while the overflow only may comprise only some dissolved tar components, i.e. be tar depleted.

As already disclosed, the tar enriched bottom fraction may be fed to the gasifier, whereby most of the tar components as well any organic liquid are gasified. Further, the need to dispose the tar components may be dispensed with. The overflow may be fed once more to the scrubber. Preferably, the overflow is cooled before being fed to the scrubber.

As part of the fed scrubber liquid neither will end up in the tar enriched fraction or nor condensate in the wet electrostatic precipitator, part of the organic liquid fed to the scrubber may constitute a make up stream of organic liquid.

In the process disclosed herein, various steams are cooled by use of heat-exchangers. The heat thus obtained, may find use in other parts of the process requiring heat, such as the optional drying of the biomass. Further, superfluous heat may be find use in nearby processes. In addition, superfluous heat may be distributed to a nearby community having a district heating net.

Figure 1:
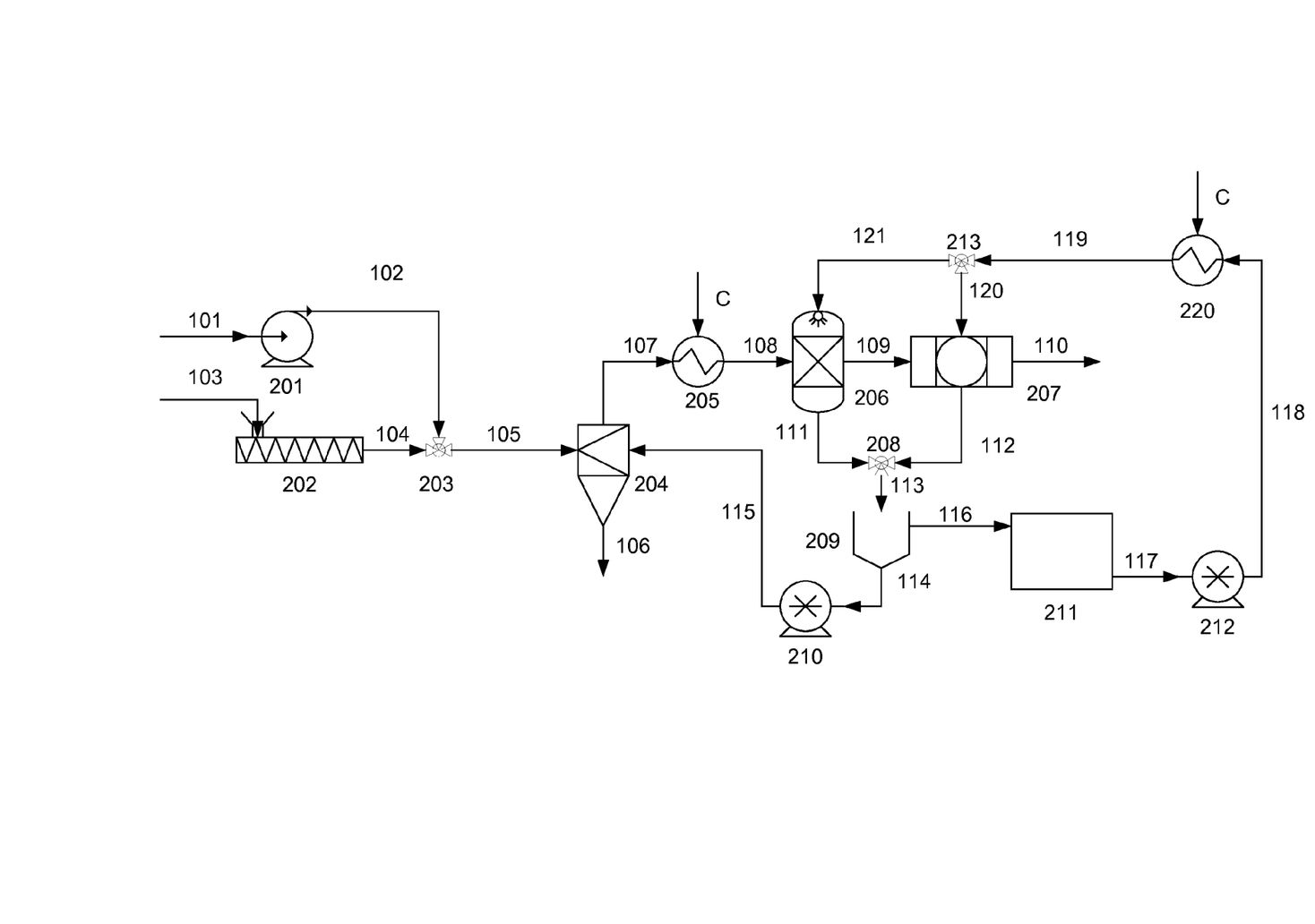
FIG. 1 depicts an illustrative detailed embodiment of a system for gasifying biomass to obtain a combustible gas for combustion in an engine.

An illustrative detailed embodiment of system for gasifying biomass to obtain a combustible gas for combustion in a combustion engine is depicted in FIG. 1. Air 101, comprising oxygen, is pumped by a fan 201 into a feed of air 102. Biomass 103 is transported by a screw feeder 202 into a feed of biomass 104. The feed of air 102 and the feed of biomass 104 are mixed at a manifold 203 into a feed of biomass and air 105, which enters a cyclone gasifier 204.

From the cyclone gasifier 204, an obtained combustible gaseous stream 107 is cooled in a heat exchanger 205, resulting in combustible gaseous stream with lower temperature 108. Residual ash 106 may be collected at the bottom of the cyclone gasifier 204.

The gaseous stream with lower temperature 108 is adiabatically and convectively cooled by contacting it with an organic liquid 119 in a spray scrubber 206, having several spray nozzles for spraying the organic liquid. Upon adiabatically and convectively cooling of the combustible gaseous stream tar components in the combustible gaseous stream are condensed and thus dissolved and/or dispersed in none-evaporated organic liquid, resulting in tar-enriched organic liquid 111, which may be collected via an outlet. The resulting adiabatically and convectively cooled combustible gaseous stream 109 is fed into a wet electrostatic precipitator 207.

In the electrostatic precipitator, particles present in the adiabatically and convectively cooled combustible gaseous stream 109 are separated, further evaporated organic liquid is condensed, resulting in particle-enriched organic liquid 112, comprising organic liquid and tar components, and a purified combustible gaseous stream 110.

The particle-enriched organic liquid 112 is combined with the tar-enriched organic liquid 111 via a manifold 208, and the resulting combined organic liquid 113 is fed into a separator 209 in form of a settling tank. A tar enriched bottom fraction 114, 115 from the separator 209 may be pumped by a pump 210 back into the cyclone gasifier 204. A tar depleted over flow 116, 117, 118, 119, 120, 121 may be stored in a reservoir tank 211 and, via a circulation pump 212, pumped to a manifold 213 for distribution to the spray scrubber 206. The tar depleted over flow 118 may be cooled in a heat exchanger 220 to the tar depleted over flow 119 before being distributed to the spray scrubber 206.

Another embodiment relates to a purification system for removing tar components from a combustible gas having a temperature above its dew-point. As elaborated herein above, such a purification system may be part of a system for gasifying biomass to obtain a combustible gas for combustion in an engine. Evidently, preferred aspects of the system for gasifying biomass relating to its purification system are applicable to the purification system for removing tar components from a combustible gas having a temperature above its dew-point as well.

The purification system for removing tar components from a combustible gas having a temperature above its dew-point may comprise:
 a spray scrubber having at least one spray nozzle for contacting the combustible gas with an organic liquid having a temperature below the dew-point of the combustible gas; further the spray scrubber may have an outlet for collecting none-evaporated organic liquid, comprising condensed tar components; and
 a wet electrostatic precipitator for separating particles and condensing evaporated scrubber liquid from the combustible gas, wherein the wet electrostatic precipitator has at least one emitter electrode, at least one collector electrode having at least one deposition surface, preferably the deposition surfaces are substantially vertically arranged, and an underlying hopper for collecting the condensed organic liquid, comprising tar components; the wet electrostatic precipitator further having cooling means for cooling the deposition surfaces.

Further, the purification system may comprise a first separator, being connected to the outlet, for collecting none-evaporated organic liquid comprising condensed tar components, of the spray scrubber, for gravimetrically separating the none-evaporated organic liquid, comprising condensed tar components, into a first tar enriched bottom fraction and a first tar depleted over flow. The first separator may have an outlet, arranged in the vicinity of the bottom of the separator, for collecting the first tar enriched bottom fraction, and an over flow, for collecting the first tar depleted over flow. Furthermore, the purification system may comprise a second separator, being connected to the hopper of the wet electrostatic precipitator, for gravimetrically separating condensed organic liquid, comprising tar components, into a second tar enriched bottom fraction and a second tar depleted over flow The second separator may have an outlet arranged in the vicinity of the bottom of the separator, for collecting the first tar enriched bottom fraction, and an over flow, for collecting the first tar depleted over flow.

The over flow of the first separator may be connected to the at least one spray nozzle of the spray scrubber, whereby the first tar depleted over flow may be contacted with the combustible gaseous stream in the spray scrubber. Similarly, the over flow of the second separator may be connected to the at least one spray nozzle of the spray scrubber, whereby the second tar depleted over flow may be contacted with the combustible gaseous stream in the spray scrubber. As the first and second separator, operates with the same organic liquid, one single separator may be used. Further, the may have cooling means, such as a heat exchanger, for cooling the over flow of the first and/or second separator before being contacted with the combustible gaseous stream in the spray scrubber.

Another embodiment relates to a method for removing tar components from a combustible gas having a temperature above its dew-point. As elaborated herein above, such a method may be part of process for gasifying biomass to obtain a combustible gas for combustion in an engine. Evidently, preferred aspects of the process for gasifying biomass relating to the steps of removing tar components are applicable to the purification system for removing tar components from a combustible gas having a temperature above its dew-point as well.

The method for removing tar components from a combustible gas having a temperature above its dew-point may comprise the steps of:
 adiabatically and convectively cooling the combustible gas by contacting it with an organic liquid having a temperature below the dew-point of the combustible gaseous stream; whereby tar components present in the combustible gas are condensed; and
 electrostatically removing particles, comprising tar components, from the adiabatically and convectively cooled combustible gas; and optionally
 condensing evaporated organic liquid present in the adiabatically and convectively cooled gas;
 to obtain a combustible gas with lower amount of tar components.

Further, the tar components, condensed by adiabatically and convectively cooling the combustible gaseous stream, and none-evaporated organic liquid, may be separated from the adiabatically and convectively cooled combustible gas into a first stream of organic liquid comprising tar components. In addition, the steps of electrostatically removing particles, comprising tar components, from the adiabatically and convectively cooled combustible gas, and condensing evaporated organic liquid present in the adiabatically and convectively cooled combustible gas, may be performed in one step, to generate a second stream of organic liquid comprising tar components.

The first stream of organic liquid comprising tar components and/or the second stream of organic liquid comprising tar components may be gravimetrical separated into a tar enriched bottom fraction and a tar depleted over flow. Further, the tar depleted over flow may be cooled to a temperature below the dew-point of the combustible gas and subsequently used to adiabatically and convectively cool the combustible gas.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

The invention claimed is:

1. A process for gasifying biomass to obtain combustible gas for combustion in a combustion engine, comprising the steps of:
    providing solid biomass having a particle size of less than 3 mm and a moisture ratio of not more than 15 wt %;
    gasifying the biomass in a cyclone gasifier at 400° C. to 1 300° C., in the presence of sub-stoichiometric quantities of oxygen;
    separating particulate matter from the combustible gaseous stream obtained by gasifying the biomass;
    adiabatically and convectively cooling the combustible gaseous stream, obtained by gasifying the biomass, by contacting it with an organic liquid having a temperature below the dew-point of the combustible gaseous stream; whereby tar components present in the combustible gaseous stream are condensed;
    electrostatically removing particles, comprising tar components, from the adiabatically and convectively cooled combustible gaseous stream; and optionally
    condensing evaporated organic liquid present in the adiabatically and convectively cooled combustible gaseous;
    to obtain a combustible gas for combustion in a combustion engine.

2. The process according to claim 1, wherein the biomass is gasified at temperature of between 700° C. and 900° C.

3. The process according to claim 1, wherein the quantity of oxygen upon gasification is less than 50%, of the amount of oxygen needed for complete combustion.

4. The process according to claim 1, wherein the organic liquid has a boiling point or more than 100° C. at atmospheric pressure.

5. The process according to claim 4, wherein the organic liquid is chosen from the group consisting of mineral oil, tall oil, tall oil middle distillate, tall oil middle distillate methyl esters, methyl esters of fatty acids, corn oil, rape seed oil, palm oil, soy oil and cotton seed oil.

6. The process according to claim 1, wherein the amount of organic liquid brought in contact with the combustible gaseous stream, to adiabatically and convectively cool it, is 4 to 10 times of the amount of combustible gaseous stream on weight basis.

7. The process according to claim 1, wherein the tar components, condensed by adiabatically and convectively cooling the combustible gaseous stream, and none-evaporated organic liquid are separated from the adiabatically and convectively cooled combustible gaseous stream into a first stream of organic liquid comprising tar components, wherein the first stream of organic liquid comprising tar components is gravimetrical separated into a tar enriched bottom fraction and a tar depleted over flow; and
    the tar enriched bottom fraction is gasified together with the biomass in the cyclone gasfier; and/or
    the tar depleted over flow is cooled to a temperature below the dew-point of the combustible gaseous stream and subsequently used to adiabatically and convectively cool the combustible gaseous stream.

8. The process according to claim 1, wherein the steps of electrostatically removing particles, comprising tar components, from the adiabatically and convectively cooled combustible gaseous stream, and condensing evaporated organic liquid present in the adiabatically and convectively cooled combustible gaseous, are performed simultaneously in one step, to generate a second stream of organic liquid comprising tar components, wherein the second stream of organic liquid comprising tar components is gravimetrical separated into a tar enriched bottom fraction and a tar depleted over flow; and
    the tar enriched bottom fraction is gasified together with the biomass in the cyclone gasfier; and/or
    the tar depleted over flow is cooled to a temperature below the dew-point of the combustible gaseous stream and subsequently used to adiabatically and convectively cool the combustible gaseous stream.

* * * * *